May 3, 1960 H. A. SCHNEIDER 2,935,685

FREQUENCY DIVIDER CIRCUIT

Filed Dec. 27, 1955 5 Sheets-Sheet 1

INVENTOR
H. A. SCHNEIDER
BY Alan C. Rose
ATTORNEY

May 3, 1960 H. A. SCHNEIDER 2,935,685

FREQUENCY DIVIDER CIRCUIT

Filed Dec. 27, 1955 5 Sheets-Sheet 2

INVENTOR
H. A. SCHNEIDER
BY
Alan C. Rose
ATTORNEY

May 3, 1960 H. A. SCHNEIDER 2,935,685

FREQUENCY DIVIDER CIRCUIT

Filed Dec. 27, 1955 5 Sheets-Sheet 3

INVENTOR
H. A. SCHNEIDER
BY Alan C. Rose
ATTORNEY

May 3, 1960 H. A. SCHNEIDER 2,935,685

FREQUENCY DIVIDER CIRCUIT

Filed Dec. 27, 1955 5 Sheets-Sheet 4

INVENTOR
H. A. SCHNEIDER
BY Alan C. Rose
ATTORNEY

FREQUENCY DIVIDER CIRCUIT

Filed Dec. 27, 1955 5 Sheets-Sheet 5

INVENTOR
H. A. SCHNEIDER
BY Alan C. Rose
ATTORNEY

United States Patent Office 2,935,685
Patented May 3, 1960

2,935,685

FREQUENCY DIVIDER CIRCUIT

Herbert A. Schneider, Englewood, N.J., assignor to Bell Telephone Laboratories, Incorporated, New York, N.Y., a corporation of New York Application December 27, 1955, Serial No. 555,555

8 Claims. (Cl. 328—39)

This invention relates to electrical pulse circuitry and more particularly to frequency division circuits for computers or similar pulse operated systems.

In the field of synchronous electrical computers, frequency division circuits are often employed to obtain control pulses which recur at submultiples of the computer base or "clock" frequency. In these circuits, a pulse may be applied to a loop circuit including a delay line, and the successive appearances of the pulse at the output of the delay or memory loop circuit establish the repetition rate of the control pulses. This type of circuit is particularly applicable to logic circuitry, and may readily be made virtually failure proof in a manner to be explained in detail hereinafter.

In many serial binary computers, information is transmitted in terms of the presence or absence of pulses in successive time intervals. The period of the "clock" frequency determines the length of these time intervals or "digit periods" which are assigned to successive binary digits. The binary numbers, or "words" which are employed in serial computers are made up of groups of binary digits. Furthermore, information is often carried in sets of several of the binary numbers or "words." Accordingly, control pulses must be provided which recur at the "word" repetition rate and at submultiples thereof.

For specific example, when there are twelve binary digits in each word and information is carried by groups of six words, control pulses are required at pulse repetition rates which are 1/12 and 1/72 of the computer clock frequency. In order to obtain a 72 to 1 frequency division ratio, the output signals from two frequency division circuits having 8 to 1 and 9 to 1 frequency division ratios may be connected respectively to separate inputs of a coincidence or AND circuit. A compound frequency division circuit of this type is disclosed in my copending application Serial No. 456,648, filed September 17, 1954, now Patent No. 2,888,557, granted May 26, 1959. The operation of the circuit is based on the fact that 72 is the least common multiple of 8 and 9, and the component frequency division circuits therefore produce simultaneous output pulses only once every seventy-two digit periods. In order to produce pulses at a rate of one pulse every twelve digit periods as well as once every seventy-two periods, however, a separate 12 to 1 division circuit has been required. Therefore, three frequency division circuits and various additional synchronizing logic circuitry are required to produce properly timed control pulses at both of the required pulse repetition rates.

Accordingly, the principal object of the present invention is to simplify and reduce the cost of pulse generation circuitry.

In one realization of the invention, a single compound frequency division circuit of the delay line type is employed to produce two sets of output control pulses which recur at respectively different submultiples of the computer base or clock frequency. In addition, the need for using component division circuits which have frequency division factors which are the least common multiple of the frequency division factor of compound circuits is avoided by the use of a simple precession circuit. For specific example, a 12 to 1 frequency division circuit and a "precessing" 6 to 1 frequency divider are employed to obtain both 12 to 1 and 72 to 1 synchronized output pulses. While the combination of a simple 12 to 1 and a simple 6 to 1 frequency division circuit would normally yield output pulses every six digits, in the present circuits the pulse pattern of the 6 to 1 divider is shifted by the precession circuit so that coincident output pulses from the two division networks only occur once every seventy-two digit periods.

Other objects and various features and advantages of the invention will become apparent from the following detailed description of the drawings, and from the appended claims.

Figure 1:
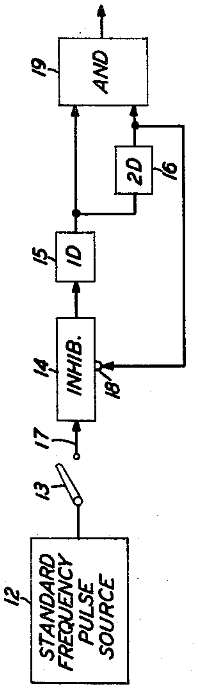
Fig. 1 shows a frequency division circuit employing a delay loop.
Figure 3:
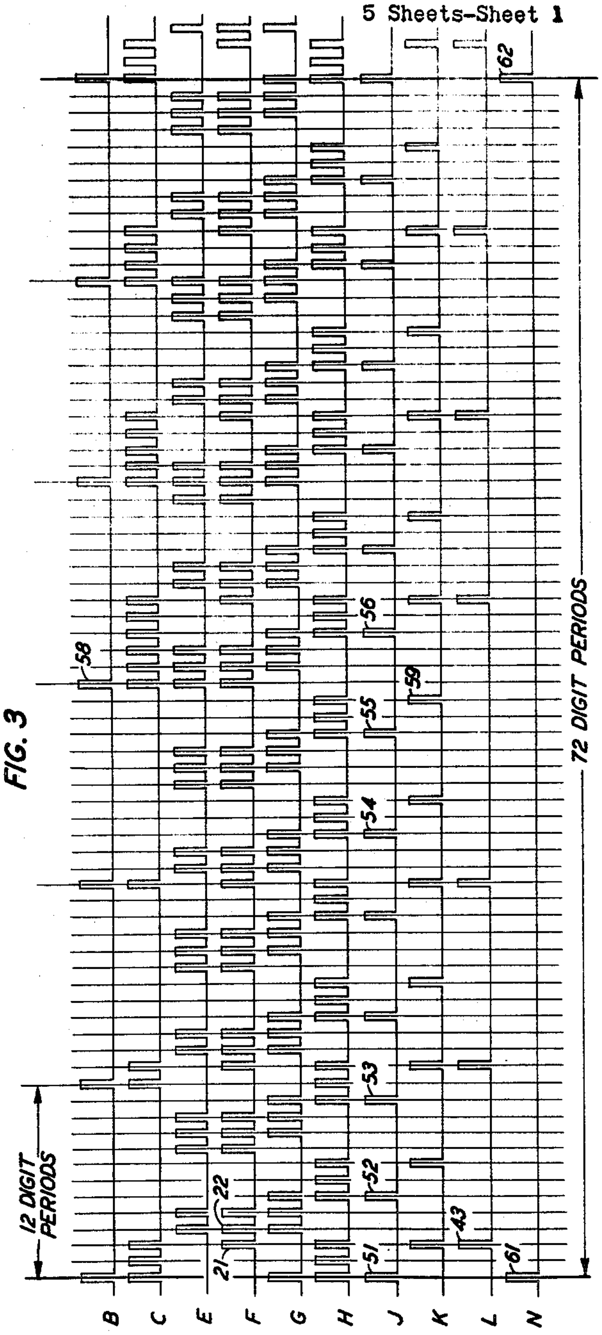
Fig. 3 is an explanatory diagram showing the electrical pulses which appear at various points in the circuit of Fig. 2 during one cycle of operation.

Referring more particularly to the drawings, Fig. 1 shows a frequency division circuit of the type disclosed in R. L. Carmichael, application Serial No. 478,666, filed December 30, 1954, now Patent No. 2,824,228, granted February 18, 1958. In Fig. 1, the standard frequency pulse source 12 produces a continuous train of output pulses at a pulse repetition rate corresponding to that of the pulses in each of the groups of pulses in pulse train F of Fig. 3, for example. The pulse repetition frequency may be, for example, three megacycles per second. The time between successive pulses, such as pulses 21 and 22 of row F of Fig. 3, is termed a "digit period" or "one digit time."

The standard frequency pulse source 12 of Fig. 1 is connected by switch 13 to a delay loop including the inhibit unit 14, the one-digit delay line 15, and the two-digit delay line 16. The inhibit unit 14 normally passes pulses applied to a normal input lead 17. However, when pulses are applied to inhibit terminal 18, output pulses from the inhibit unit are blocked or "inhibited." Thus, in the operation of the frequency division circuit of Fig. 1 following the closure of switch 13, three pulses are transmitted through the inhibit unit 14. These three pulses pass through delay lines 15 and 16, which have a total delay of three digit periods, and arrive successively at inhibit terminal 18 of the inhibit unit 14 during the next subsequent digit periods. Accordingly, successive groups of three pulses and three spaces appear at the output of the inhibit unit 14.

A delay loop as shown in Fig. 1 in which the output from an inhibit unit is connected back to the inhibiting terminal of the unit supports a repetitive pulse pattern. The cycle of the repetitive pulse pattern is equal to twice the number of digits of delay in the loop. In addition, delay loops of this type have the property that the output pulse pattern includes only a predetermined number of pulses during each cycle. Thus, when an extra pulse is inserted into the delay loop, another pulse is deleted and, similarly, when a pulse is deleted from the loop, another pulse is inserted. Accordingly, this type of delay loop is termed a "constant capacity" delay or memory loop. The constant capacity nature of this type of circuit is explained in greater detail in H. A. Schneider application Serial No. 555,556, filed December 27, 1955, and entitled "Self-Correcting Pulse Circuits," now Patent No. 2,876,352, granted March 3, 1959.

Returning to Fig. 1, pulse trains from the outputs of delay lines 15 and 16 are applied to the two inputs of the AND unit 19. An AND unit, as its name implies, requires energization of all input circuits to produce an output pulse. Therefore, pulses from the AND unit 19 only occur when pulses are present at the output of both delay lines 15 and 16. This only occurs once every six digit periods, or once for each group of three pulses which pass through the two delay lines. The mode of operation of simple single delay loop frequency division circuits such as that shown in Fig. 1 is explained in substantially greater detail in R. L. Carmichael application Serial No. 478,666, now Patent No. 2,824,228, granted February 18, 1958, mentioned above.

Figure 2:
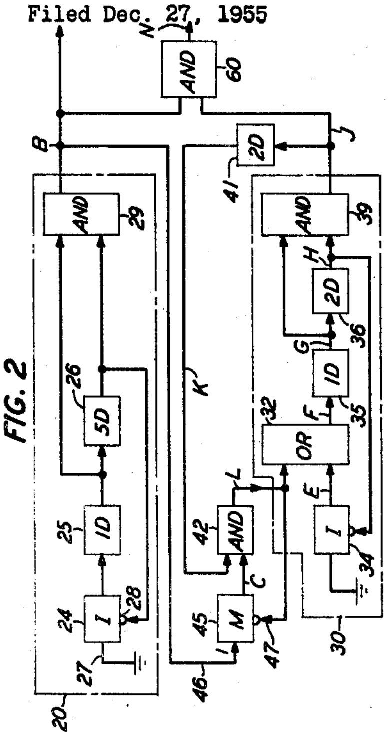
Fig. 2 shows a pulse generation circuit in accordance with the invention which includes two frequency division circuits of the type shown in Fig. 1.

Before proceeding with a detailed description of Fig. 2, the instrumentation of the logic circuit components will be discussed briefly. The properties of AND, inhibit and delay units have been discussed above in the course of describing Fig. 1. A fourth logic circuit unit which is employed in Fig. 2 is the OR unit. One such unit is shown at 32 in Fig. 2. An OR unit has the properties that the application of a pulse to any of its input leads produces an output pulse. OR units may therefore be considered to be simple buffer elements preventing the flow of current back from one input circuit to another.

The OR, AND, inhibit and delay units discussed above are four of the "building blocks" or basic circuit units which may be employed by the logic circuit designer. Many realizations of these circuits have been proposed heretofore, and the present circuits are not limited to any specific form of these logic circuit units. As a specific example, one workable set of logic packages is disclosed in an article entitled "Regenerative Amplifier for Digital Computer Applications" by J. H. Felker, which appears at pages 1584 through 1596 of the November 1952 issue of the Proceedings of the I.R.E. (volume 40, No. 11). Another set of circuits which may be employed is disclosed in H. A. Schneider, application Serial No. 456,648, filed September 17, 1954, now Patent No. 2,888,557, granted May 26, 1959, and in J. H. Vogelsong, application Serial No. 437,401, filed June 17, 1954.

In addition to the logic circuit elements, pulse regenerator circuits (not shown in Fig. 2) are employed to maintain appropriate voltage levels, and to insure synchronism of operations throughout the computer. Suitable pulse regenerator circuits are also disclosed in the articles and patent applications cited in the preceding paragraph. A standard frequency source is applied to each pulse regenerator to accurately control the timing of output pulses. The input to each regenerator is normally maintained at a slightly negative voltage, and no output pulses are produced under these circumstances. However, when a positive going pulse raises the input voltage to ground potential or above, an appropriately timed output pulse is produced.

Figure 6A:
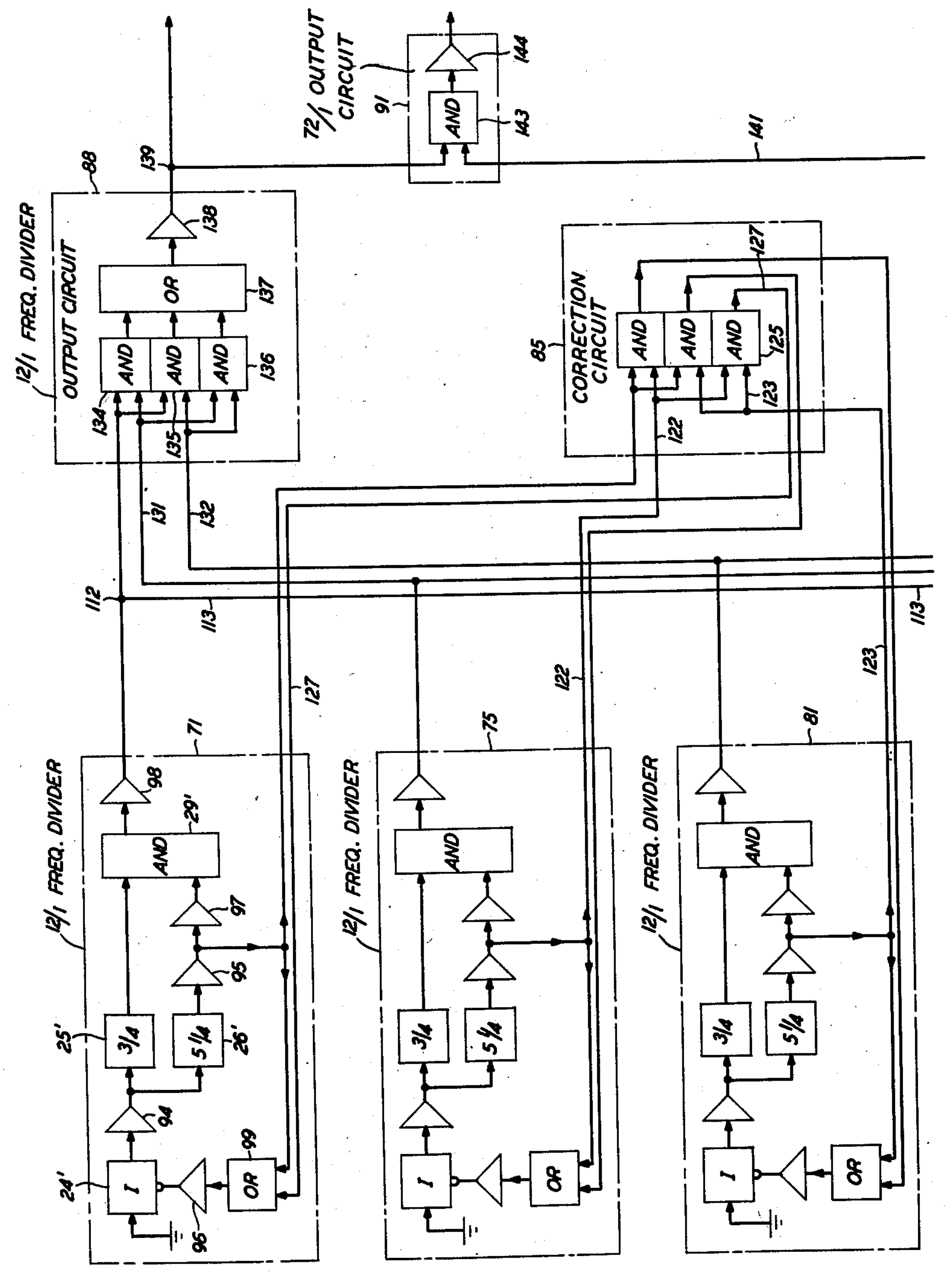
Figs. 6A, 6B and 6C are block schematic diagrams forming a detailed logic circuit diagram of the self-correcting frequency division circuit of Fig. 4.
Figures 5, 6B:
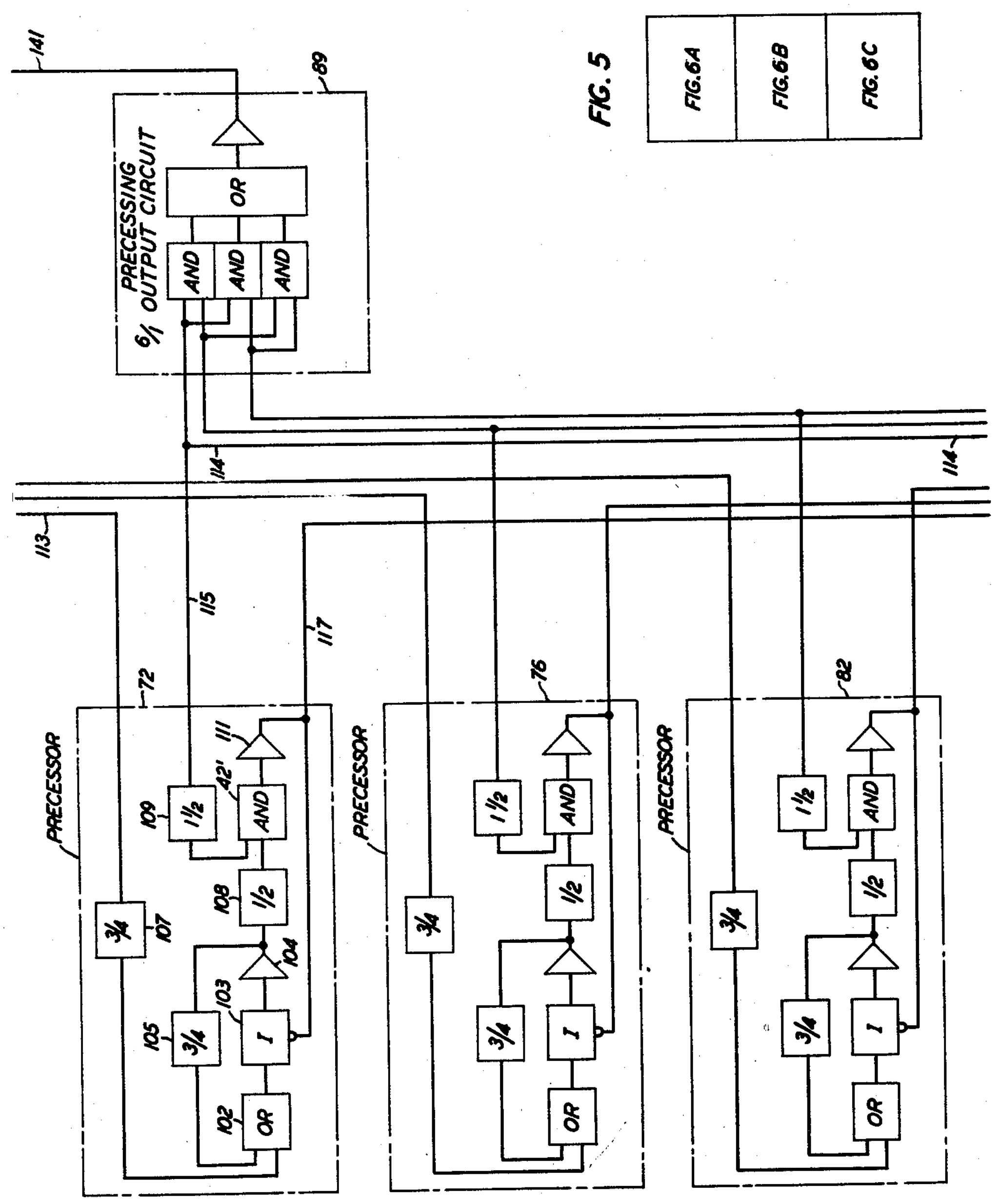
Fig. 5 is a diagram indicating the positioning of Figs. 6A, 6B and 6C which appear on Sheets 3, 4 and 5 of the drawings required to form a complete circuit.
Figure 6C:
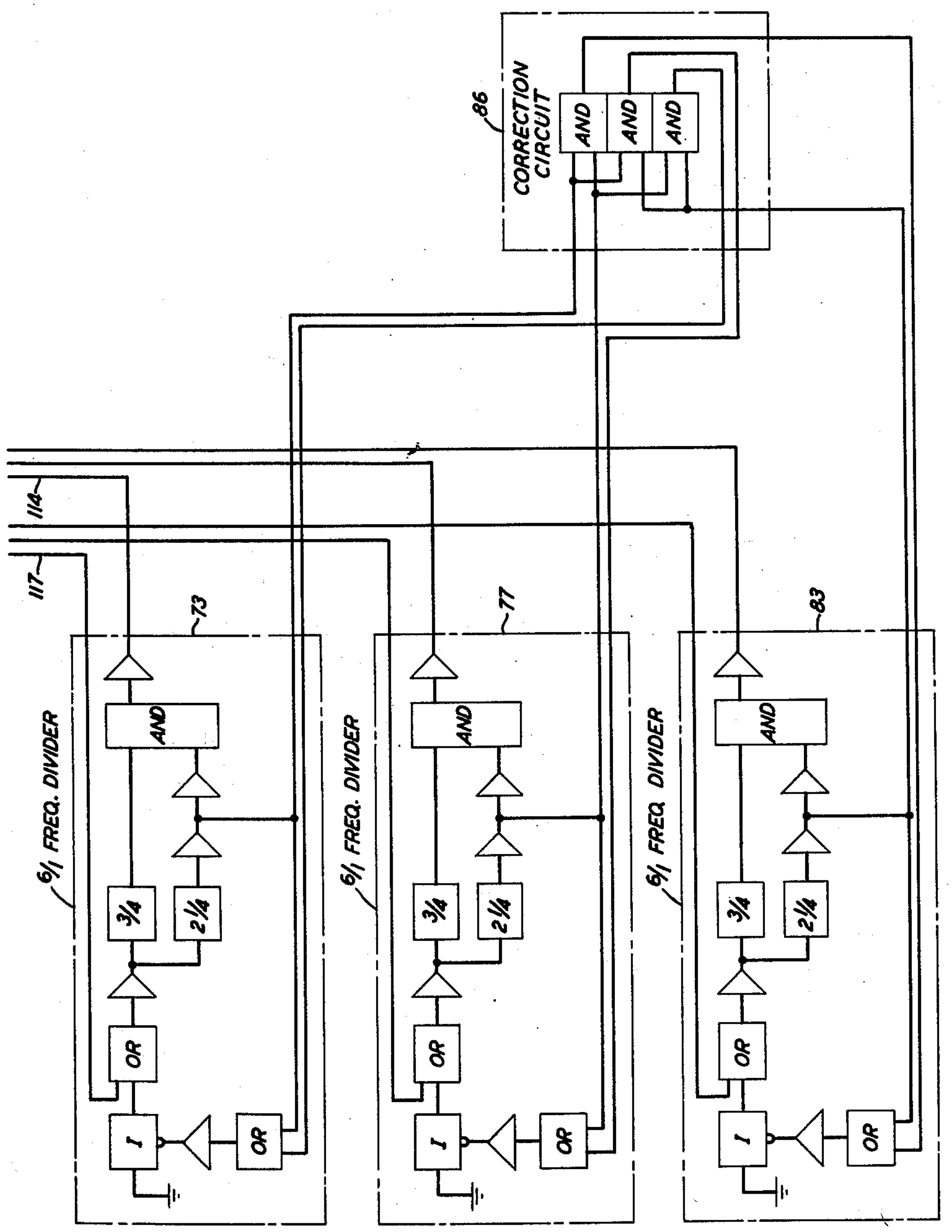

As shown in detail in the circuit diagram of Figs. 6A through 6C, a pulse regenerator is associated with each inhibit unit. Pulse regenerators may also be included elsewhere in the logic circuitry as needed to supply the required power to drive the logic circuits which they precede. In Figs. 1 and 2, however, the pulse regenerators are not shown separately, but are included in the appropriate preceding logic circuits. It is therefore assumed that the inhibit units 24 and 34 of Fig. 2, for specific example, include pulse regenerators. Thus, for the purposes of the showing in the block diagram of Fig. 2, all logic and delay circuits are considered to be without loss, and it is assumed that the logic circuits introduce no delay.

Fig. 2 includes two frequency division circuits 20 and 30 which are comparable to the frequency division circuit of Fig. 1. The frequency division circuit 20 is a simple 12 to 1 division circuit. It includes the inhibit unit 24, the delay units 25, 26, and the AND unit 29 which correspond to the units 14, 15, 16 and 19, respectively, of Fig. 1. In general, the amount of frequency division is determined by the number of digits of delay in the delay loop, and is equal to twice the number of digits of delay when a circuit arrangement such as that shown in Fig. 1 is employed. Thus, the 6 to 1 frequency division ratio of the circuit of Fig. 1 results from the three digits of delay included in delay units 15 and 16. Similarly, the 12 to 1 frequency division ratio of the circuit 20 included in Fig. 2 is a result of the one-digit delay unit 25 and the five-digit delay unit 26, having a total delay of six digit periods.

Another difference between the frequency division circuit 20 of Fig. 2 and that of Fig. 1 is the input circuits to the inhibit units 14 and 24. In Fig. 1, a standard frequency pulse source 12 is shown connected to the normal input 17 of the inhibit unit 14. In Fig. 2, however, the normal input 27 to the inhibit unit 24 is grounded. The inhibit unit 24 includes a pulse regenerator as mentioned above, and this pulse regenerator produces properly timed output pulses when its input potential is raised to ground level or above. Grounding the input terminal of the inhibit unit 24 is equivalent to applying pulses thereto, and output pulses are accordingly produced unless pulses are present at the inhibit terminal 28 of the unit 24. The circuit 20 of Fig. 2 is therefore a simple frequency division circuit in which output pulses from the AND unit 29 appear at point B every twelfth digit period. These pulses appear in row B of Fig. 3 and form a frame of reference for the remaining pulse trains which are shown in Fig. 3.

The frequency division circuit 30 of Fig. 2 is also quite similar to the frequency division circuit of Fig. 1, and to the division circuit 20 shown in the upper portion of Fig. 2. Ignoring the OR unit 32 momentarily, the remaining logic units in the frequency division circuit 30 are the inhibit unit 34, the delay units 35 and 36, and the AND unit 39 which correspond to the logic units 14, 15, 16 and 19, respectively, of Fig. 1. In the absence of the additional logic circuitry, the circuit 30 would be a frequency division circuit having a 6 to 1 division ratio. The output from the AND unit 39 is shown in row J of Fig. 3. Instead of showing a simple 6 to 1 frequency division output, the pulse train in row J is actually made up of pulses which are alternately six and five-digit periods apart. In addition, and for reasons which will also be described hereinafter, the regular precession of six and five-digit period intervals at point J is interrupted once every seventy-two digit periods, and the six-digit period interval occurs twice in a row.

The collateral circuitry required to change the mode of operation of the frequency division circuit 30 will now be described. Initially, it may be noted that the output point J from the AND circuit 39 is connected through the two-digit delay unit 41 and the AND unit 42 to one input of the OR unit 32, and is thus connected back into the division circuit memory loop. This feedback circuit introduces an extra pulse into the memory loop, and thus modifies the normal output of the frequency division circuit. If the frequency division circuit were a simple division circuit of the type shown in Fig. 1, the inhibit unit 34 would pass three pulses and would then block pulses for three digit periods. Instead, the inhibit unit output at point E is a series of three pulses and three spaces, followed by two pulses and three spaces, as indicated in row E of Fig. 3. The timing of the additional pulses inserted at point F is shown in row L of Fig. 3. The introduction of pulses at this point has the effect of reducing the number of spaces between pulse groups in the memory loop of the frequency division circuit 30. This is shown in row F of Fig. 3, in which three pulses alternate with two spaces. To indicate the interrelation between the rows of pulses mentioned above, it may be noted that pulse 43 in row L appears as pulse 21 in row F at point F at the output of OR unit 32.

Another logic element which has not been discussed as yet is a memory unit such as the unit 45 in Fig. 2. A memory unit is a logic unit which may be set to either of two states. When a pulse is applied to the "set 1" input 46 of memory unit 45, a series of output pulses is produced at point C, the output of the memory unit. These pulses continue until the "set 0" lead 47 is energized. This action turns off the memory unit 45, and no further output pulses are produced until the "set 1" lead 46 is again energized. The internal circuitry of simple memory units of this type is well known and is disclosed, for example, in the Felker article cited above.

In the consideration of memory cells, it should be noted that memory circuits can be arranged so that the "set 0" lead predominates over the "set 1" lead, or vice versa. In the present technology, the "set 0" lead is given precedence. Thus, for example, in Fig. 2 pulses applied to lead 47 predominate over pulses applied to lead 46 of the memory unit 45. When pulses are applied simultaneously to both leads, no output will be produced at point L. Similarly, if the memory unit had been energized previously, the simultaneous arrival of pulses at both input leads sets the memory unit to the deenergized state. In the circuit of Fig. 2, the delay between the "set 0" lead 47 and the output of the memory unit 45 is assumed to be one digit period. In addition, the delay through the memory cell from the "set 1" lead 46 is assumed to be equal to zero.

Output pulses from the 12 to 1 frequency division circuit 20 at point B energize the "set 1" lead 46 of the memory unit 45. Pulses at the output C of the memory unit 45 are shown at row C in Fig. 3. The concurrent energization of the two input leads of the AND unit 42 applies a pulse (indicated at row L in Fig. 3) to the "set 0" lead 47 of memory unit 45, and deenergizes it. The requirement that pulses must be present at point C as well as at point K at the input to the AND unit 42 results in the elimination of every second pulse which is fed back from point J at the output of division circuit 30. Thus, for example, row K in Fig. 3 has approximately twice as many pulses as row L, which represents the pulses at the output of AND unit 42. The pulses at L are inserted into the memory loop of the division circuit 30 almost every second cycle. Accordingly, the output pulses at J have their normal six-digit separation during one cycle, and during the next successive cycle the insertion of pulses from point L reduces the pulse spacing to five digits. Thus, for example, the space between pulses 51 and 52 is five digits because of the insertion of pulse 43 which appears as pulse 21 at point F in the memory loop. However, the next cycle is not interrupted by pulses from point L, and a full six-digit interval separates pulses 52 and 53 in row J.

The usual alternation of five and six-digit periods is changed in the vicinity of the pulses numbered 54, 55 and 56 in row J. The spacing between pulses 54 and 55 is six digits. It would therefore normally be expected that a pulse from point L would be inserted into the delay loop of circuit 30 during the next cycle, and that the space between pulses 55 and 56 would be reduced to five digit periods. Once during each seventy-two digit period cycle, a pulse such as pulse 58 in row B occurs one digit period after the corresponding pulse 59 in row K, with which it would normally be associated to gate pulses through the AND unit 42. Consequently, the memory unit 45 is energized one digit period too late, and no pulse appears in row L immediately below pulse 59. Under these circumstances described above, during each seventy-two digit period cycle, output pulses at row J recur at alternate five and six-digit period intervals with the exception of one cycle in which two six-digit periods follow each other.

In order to produce an output pulse at N, it is necessary to have pulses both at point B at the output of division circuit 20, and at point J at the output of circuit 30. As mentioned above and as indicated in row B of Fig. 3, output pulses appear at point B every twelfth digit period. The alternate five and six-digit period spacing at point J coupled with the extra six-digit period interval which occurs once each seventy-two digit periods results in coincident pulses at points B and J once every seventy-two digit periods. This coincidence in pulses in rows B and J of Fig. 3 is indicated by pulses 61 and 62 in row N representing the output of the AND unit 60. Fig. 2, therefore, yields a word pulse output of one pulse every twelve digit periods at point B, and a synchronized major cycle output pulse once every seventy-two digit periods at point N.

In the patent of H. A. Schneider entitled "Self-Correcting Pulse Circuits" mentioned above, three identical frequency division circuits are employed. In addition, correction circuitry is provided to correct any one of the three frequency division circuits which gets out of step with the other two circuits.

Figure 4:
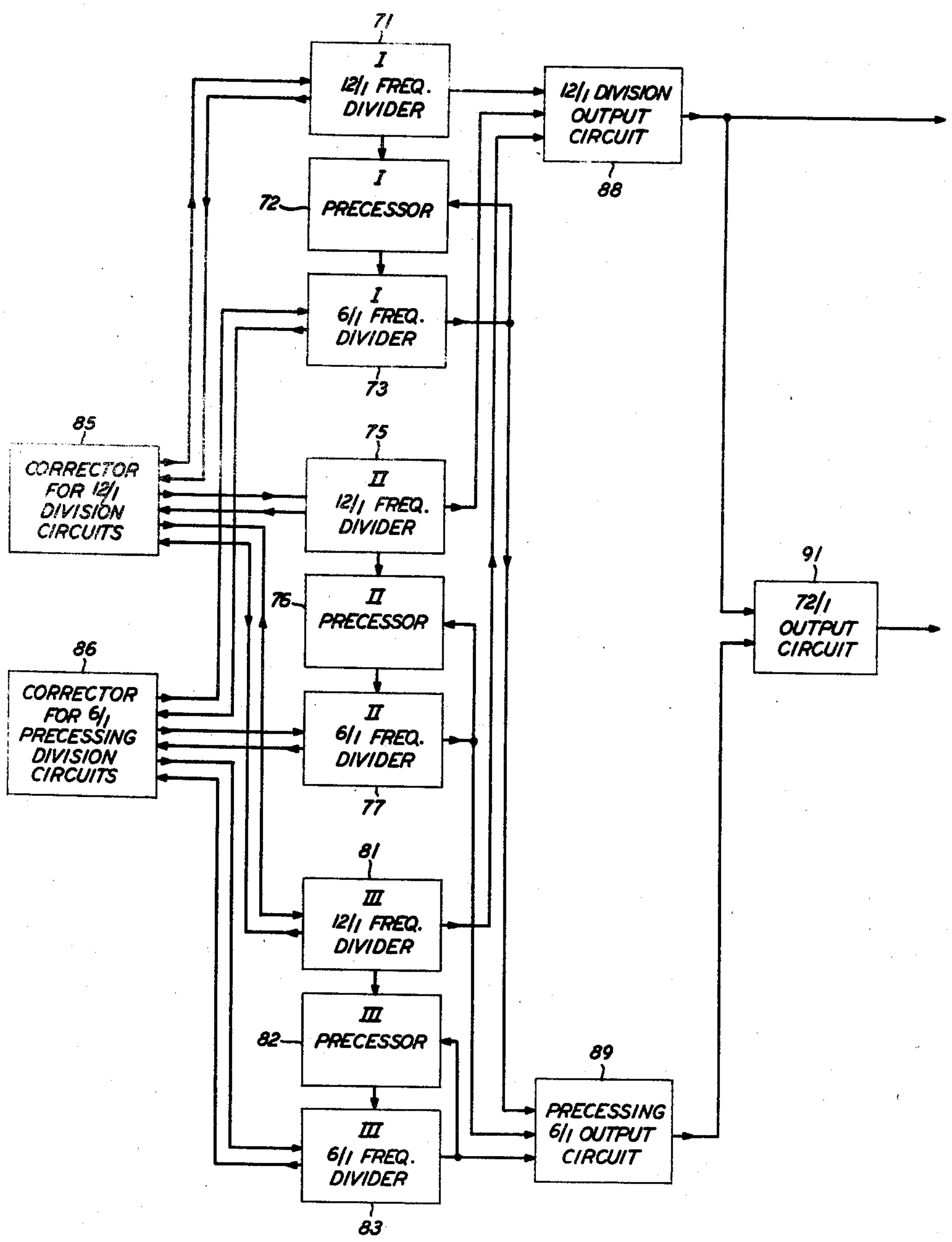
Fig. 4 is a block diagram of a self-correcting pulse generation circuit.

Fig. 4 is a block diagram of a self-correcting pulse generation circuit. In Fig. 4, each group of three circuits bearing the same Roman numeral represents a complete pulse generation circuit such as that shown in Fig. 2. Thus, for example, the three blocks designated 71, 72 and 73 are all identified by the Roman numeral I and form a complete pulse generation circuit. More specifically, the 12 to 1 frequency divider 71 corresponds to the circuit 20 of Fig. 2; the 6 to 1 frequency divider 73 corresponds to the circuit 30 of Fig. 2; and the precessor 72 of Fig. 4 corresponds to the precession circuitry including units 41, 42 and 45 in Fig. 2. Similarly, the three blocks 75, 76 and 77 identified by Roman numeral II, and the three blocks 81, 82 and 83 identified by Roman numeral III, constitute second and third pulse generation circuits which also duplicate the circuitry of Fig. 2.

The correction circuit 85 receives pulses from the 12 to 1 frequency division circuits 71, 75 and 81. If pulses are received from any two of the three 12 to 1 frequency division circuits, a pulse is transmitted to the third frequency division circuit. This mode of operation corrects any transient failures which occur in the division circuits, as explained in detail in the Schneider application entitled "Self-Correcting Pulse Circuits" mentioned above.

The output circuits 88 and 89 yield pulses when any two of the three input circuits are energized. The 72 to 1 output circuit 91 is a simple coincidence or AND circuit. It is clear that a majority rule output circuit similar to that used for the 12 to 1 and 6 to 1 division circuits may also be used here.

The circuit of Figs. 6A, 6B and 6C is a detailed logic circuit diagram of the circuit presented in block diagram form in Fig. 4. Fig. 5, which appears on Sheet 4 of the drawings, indicates the relative positions of Figs. 6A, 6B and 6C in the complete circuit. The circuit of Figs. 6A, 6B and 6C is presented in terms of technology described in H. A. Schneider application Serial No. 456,648 cited above. More specifically, the individual amplifiers required by this technology are shown in their proper positions and the exact amount of delay is indicated in each case. In comparing Figs. 6A, 6B and 6C with the block diagram of Fig. 4, it may be noted that the circuits have been rearranged slightly to facilitate the interconnections with the correction and output circuitry. For example, the three 12 to 1 frequency division circuits 71, 75 and 81 appear in Fig. 6A; the three precession circuits 72, 76 and 82 appear in Fig. 6B; and the three 6 to 1 frequency division circuits 73, 77 and 83 are shown in Fig. 6C.

To establish the correspondence between the 12 to 1 frequency division circuits of Fig. 6A with the circuit 20 of Fig. 2, the comparable units have been given the same numerals, with the addition of primes; thus, for example, the inhibit unit 24' of circuit 71 in Fig. 6A corresponds to the inhibit unit 24 in circuit 20 of Fig. 2. Similarly, the delay units 25' and 26' and the AND unit 29' perform the same functions as the corresponding units 25, 26 and 29 of Fig. 2. In circuit 71, however, a number of additional amplifier or regenerator circuits 94 through 98 are also provided. These amplifier units provide the necessary energy to drive the next following logic units and also reestablish the shape and the timing of the circulating pulses. The OR unit 99 is also included in the circuit 71 to permit the introduction of correction pulses. In the circuit 71, the loop connecting the output of inhibit unit 24' with its inhibiting input terminal includes the amplifier 94, the five and one-quarter digit delay line 26', the regenerator 95, the OR unit 99, and the regenerator 96. As discussed in detail in connection with Fig. 2, this delay loop must include a total of six digit periods of delay. With one-quarter digit period of delay being introduced by each of the regenerators 94, 95 and 96, the delay line 26' must include five and one-quarter digit periods of delay in order to produce the desired total of six digit periods of delay. The circuits 75 and 81 are duplicates of the frequency division circuit 71 described above, and thus need no further explanation. The three 6 to 1 frequency division circuits 73, 77 and 83 which appear in Fig. 6C bear the same relationship to frequency division circuit 30 of Fig. 2 that the three 12 to 1 frequency division circuits of Fig. 6A bear to circuit 20 of Fig. 2.

Referring to the precessor circuit 72 of Fig. 6B, the four circuit units 102 through 105 correspond to the memory unit 45 of Fig. 2. The AND unit 42' corresponds to the AND unit 42 of Fig. 2. In addition to the elements noted above, the precessor 72 includes the delay lines 107, 108 and 109, and an adidtional pulse regenerator 111. The precessor 72 is associated with the 12 to 1 frequency division circuit 71 and the 6 to 1 frequency division circuit 73 to form a single circuit which includes substantially all of the components which appear in Fig. 2. Thus, pulses from the output 112 of the frequency division circuit 71 are transmitted on lead 113 to the precessor 72. In addition, pulses from the output lead 114 of the division circuit 73 are transmitted to another input lead 115 of the precessor circuit 72. Finally, output pulses from the precessor circuit 72 are transmitted on lead 117 to the division circuit 73 where they are introduced into the delay loop. This mode of operation is substantially the same as that described above in connection with Fig. 2, the only significant difference in the circuits being the use of pulse regenerators where required, and the appropriate changes in the length of delay lines to compensate for delays introduced by the pulse regenerators.

The correction circuit 85 corrects transient failures in the 12 to 1 frequency division circuits 71, 75 and 81. For example, if a pulse is missing from the delay loop of frequency division circuit 71 but is present in the delay loops of circuits 75 and 81, the circuit 85 rectifies the failure. Specifically, pulses from the delay loops of circuits 75 and 81 are applied on leads 122 and 123, respectively, to energize both of the inputs of the AND unit 125 included in correction circuit 85. When this occurs, a pulse is applied to the output lead 127 of AND unit 125, which is connected to the OR unit 99 in the division circuit 71. This action restores the pulse which was missing from the delay line of division circuit 71.

Similarly, if a pulse is missing from either of circuits 75 or 81, the correction circuit 85 will rectify the error. Similarly, extra pulses in a single frequency division circuit are corrected within one cycle of operation by the correction circuit 85. This results from the constant capacity nature of the delay loops, and is explained in detail in the Schneider application entitled "Self-Correcting Pulse Circuits" mentioned above.

In Fig. 6C, the correction circuit 86 interconnects the three 6 to 1 frequency division circuits 73, 77 and 83. In its correcting action, the circuit 86 operates in substantially the same manner as the correction circuit 85 described in the preceding paragraph.

The output circuit 88 for the 12 to 1 frequency division circuit operates on a two out of three basis. Thus, for example, if there is an output pulse present on lead 112 but not on leads 131 or 132, one input to each of the AND units 134 and 135 is energized, but none of the AND units 134 through 136 have both input leads energized. Accordingly, no pulses are transmitted to the OR unit 137 or through the OR unit 137 and the regenerator 138 to output terminal 139. When pulses are present on both leads 112 and 131, however, both of the input leads to the AND unit 134 are energized, and an output pulse is transmitted through the OR unit 137 to the output terminal 139. Similarly, if any two of the three leads 112, 131 and 132 are energized or if all three leads are energized, an output pulse appears at terminal 139. A single pulse on any lead will clearly not produce such an output pulse. It is evident, therefore, that the output signals at point 139 are independent of transient failure in any of the frequency division circuitry. Similarly, permanent faults in any one of the multipled circuits does not produce an error in the output signals.

The output circuit 89 for the 6 to 1 frequency division circuits operates in a similar manner. Thus, it requires outputs from two of the three 6 to 1 frequency division circuits 73, 77 and 83 to produce an output pulse on lead 141 at the output of circuit 89.

The 72 to 1 output circuit 91 is made up of a simple AND unit 143 and a pulse regenerator 144. The AND unit 143 is responsive to the concurrent presence of pulses at the output terminal 139 and on lead 141. Accordingly, pulses are produced at the output of pulse regenerator 144 once every seventy-two digit periods, as described above in connection with Figs. 2 and 3.

It is to be understood that the above described arrangements are illustrative of the principles of the invention. Numerous other arrangements may be devised by those skilled in the art without departing from the spirit and scope of the invention.

What is claimed is:

1. In combination, a first frequency division circuit, a second frequency division circuit, means for alternately varying the frequency division ratio of said second frequency division circuit, a first output circuit connected to said first frequency division circuit, a second output circuit, and means responsive to the presence of output signals from both said first and said second frequency division circuits for energizing said second output circuit.

2. In combination, a frequency division circuit having a preassigned frequency division ratio and including an inhibit unit, a delay line and a pulse regenerator connected in a series circuital loop with the output terminal of said inhibit unit and the inhibiting input terminal of said inhibit unit; an AND circuit having its output circuit connected to said loop, a delay unit connected from the output of said frequency division circuit to one input of said AND unit, a memory unit connected to the other input of said AND unit, and means for setting said memory unit to its energized state at intervals which are longer than the intervals between output pulses from said division circuit.

3. In combination, a first frequency division circuit having a preassigned division ratio $x_1$, a second frequency division circuit having a preassigned frequency division ratio $x_2$ where $x_2$ is equal to or less than $x_1$ and where the least common multiple of $x_1$ and $x_2$ is less than the product of $x_1$ times $x_2$, and circuit means controlled by output pulses from said first and second circuits for varying the frequency division ratio of said second circuit.

4. In a self-correcting pulse generation circuit a first group of three frequency division circuits each including an inhibit unit and a delay loop interconnecting the output terminal of said inhibit unit and the inhibiting input terminal of said inhibit unit, each of said three frequency division circuits having the same preassigned frequency division ratio; a second group of three frequency division circuits each including an inhibit unit and a delay loop interconnecting the output terminal of said inhibit unit and the inhibiting input terminal of said inhibit unit, and each of said frequency division circuits having a frequency division ratio which is less than said preassigned frequency division ratio of the circuits in said first group; three precession circuits each intercoupling a different frequency division circuit of said first group of frequency division circuits with a different frequency division circuit of said second group of frequency division circuits; a first correction circuit means responsive to the presence of pulses in any two of the three frequency division circuits in said first group for inserting a pulse into the third circuit, and a second correction circuit means responsive to the presence of pulses in any two of the three frequency division circuits in said second group for inserting a pulse into the third circuit.

5. In combination, a first frequency division circuit, a first output circuit connected to said first frequency division circuit, a second frequency division circuit, means responsive to output pulses from said first output circuit and to pulses from said second division circuit for varying the frequency division ratio of said second frequency division circuit alternately on successive counting cycles, a second output circuit, and means responsive to the presence of output signals from both said first and said second frequency division circuits for energizing said second output circuit.

6. In combination, a first frequency division circuit having a preassigned frequency division factor, a second frequency division circuit having a different preassigned frequency division factor, said two frequency division factors having a common multiple, means for shifting the frequency division factor of said second frequency division circuit alternately on successive counting cycles, a first output circuit connected to said first frequency division circuit, a second output circuit, and means responsive to the presence of output signals from both said first and said second frequency division circuits for energizing said second output circuit.

7. In combination, a frequency division circuit having a preassigned frequency division ratio and including an inhibit unit, a delay line and a pulse regenerator connected in a series circuital loop with the output terminal of said inhibit unit and the inhibiting input terminal of said inhibit unit; an AND circuit having its output circuit connected to said loop, a delay unit connected from the output of said frequency division circuit to one input of said AND unit, and means for applying pulses to another input of said AND unit concurrently with the arrival of selected pulses from the output of said frequency division circuit.

8. In combination, a frequency division circuit having a preassigned frequency division ratio and including an inhibit unit, a delay line, and a pulse regenerator connected in a series circuital loop with the output terminal of said inhibit unit and the inhibiting input terminal of said inhibit unit; a gating circuit having its output connected to said loop, a circuit connected from the output of said frequency division circuit to an input of said gating circuit, and means for periodically enabling said gating circuit to transmit only selected ones of the pulses from the output of said frequency division circuit to said delay loop.

References Cited in the file of this patent

UNITED STATES PATENTS

| | | |
|---|---|---|
| 2,521,789 | Grosdoff | Sept. 12, 1950 |
| 2,568,319 | Christensen | Sept. 18, 1951 |
| 2,602,140 | Fink | July 1, 1952 |
| 2,617,873 | Lovell-Foot et al. | Nov. 11, 1952 |
| 2,696,556 | Williams | Dec. 7, 1954 |
| 2,824,228 | Carmichael | Feb. 18, 1958 |

FOREIGN PATENTS

| | | |
|---|---|---|
| 754,908 | Great Britain | Aug. 15, 1946 |